3,743,715
COPOLYMER OF N-VINYL PYRROLIDONE/VINYL ESTER/UNSATURATED MONOBASIC CARBOXYLIC ACID IN A HAIR LACQUER OR LOTION
André Viout, Paris, and Christos Papantoniou, Eipnay-sur-Seine, France, assignors to Societe Anonyme dite: L'Oreal
No Drawing. Filed May 4, 1970, Ser. No. 34,580
Claims priority, application Luxembourg, May 9, 1969, 58,617
Int. Cl. A61k 1/10
U.S. Cl. 424—47　　　　　　　　　　　　　8 Claims

ABSTRACT OF THE DISCLOSURE

Hair lacquer and lotion compositions containing in a cosmetically acceptable vehicle or carrier a copolymer of 40–90 weight percent N-vinyl pyrrolidone, 5–40 weight percent vinyl ester and 3–20 weight percent unsaturated monobasic carboxylic acid.

---

This invention relates to a novel hair set lacquer and lotion composition and to novel copolymers useful in the preparation of hair set lacquers and lotions. More particularly, the present invention relates to a hair set lacquer or lotion composition which contains a copolymer of N-vinyl pyrrolidone with at least one vinyl ester and at least one monobasic unsaturated acid containing 4–11 carbon atoms. The invention also relates, specifically to novel copolymers of N-vinyl pyrrolidone with one of vinyl stearate or vinyl laurate and with a monobasic unsaturated acid selected from the group consisting of crotonic, vinyl acetic, allylacetic or allyloxy-acetic acid.

Heretofore hair set lacquers and lotions have been produced using as the principal lacquering or setting ingredient a copolymer of N-vinyl pyrrolidone with acrylic acid and an acrylate. Still other prior art hair set lacquers and lotions have been formulated with a terpolymer of N-vinyl pyrrolidone, vinyl stearate and either vinyl acetate or acrylic ester. It has also been known to employ in conventional hair set lotions and lacquers a copolymer of N-vinyl pyrrolidone and vinyl acetate as well as a copolymer obtained by copolymerizing 80 to 95% N-vinyl-ε-caprolactam with a vinyl ester, a methacrylate, an acrylate, an acrylamide or a vinyl ether.

While such polymers have been found to be advantageous over shellac based hair set lacquers and lotions which they replaced, such polymer based compositions exhibit certain disadvantages in that they do not possess to the degree desired such characteristics as solubity in water and in alcohols, for instance, lower alkanols, film strength sufficient to control their placement and film resiliency or plasticity to permit the hair to be combed without undue breakage of the film. Further, such prior art hair set lacquers and lotions were often difficult to remove from the hair and extensive build-up of residual film on the hair resulted in an undesirable appearance characteristic.

It has now been found that the disadvantages of prior art hair set lacquers and lotions can be overcome by the present invention wherein the novel hair set lacquer and lotion possesses significantly improved water and/or alcohol solubility properties, even when the carboxyl substituents on the polymer chain are not neutralized. Further, the film produced by the hair set lacquer or lotion exhibits highly improved plasticity characteristics and said film of resin can be more easily and completely removed, when desired, by simple techniques such as brushing or shampooing the hair.

Thus, the novel hair set lacquer and lotion composition of this invention comprises a cosmetic vehicle and a film-forming copolymer of 40–90 weight percent N-vinyl pyrrolidone, 5–40 weight percent of at least one vinyl ester and 3–20 weight percent of at least one monobasic unsaturated acid containing 4–11 carbon atoms.

The copolymers of the present invention are prepared by conventional polymerization techniques, for instance, by bulk or solution polymerization wherein the solvent can be, for example, an alcohol, a glycol or a glycol ether. The polymerization is preferably effected in the presence of a catalyst such as benzoyl peroxide, lauroyl peroxide or azo-bis-isobutyronitrile, the catalyst being present in the reaction mass in amounts ranging from about 0.5–5 and, preferably, about 0.9–3 weight percent of the weight of the starting monomers.

Vinyl esters usefully employed in producing the film-forming copolymers incorporated into the hair set lacquers and lotions of this invention are vinyl esters of a monobasic carboxylic acid having about 2–22 carbon atoms. Representative of such vinyl esters are vinyl acetate, vinyl propionate, vinyl butyrate, vinyl caproate, vinyl octanoate, vinyl laurate, vinyl palmitate, vinyl stearate, vinyl isostearate and vinyl behenate.

The monobasic unsaturated acids containing 4–11 carbon atoms can include those whose hydrocarbon chain is interrupted by an oxygen atom. Particularly useful acids are crotonic acid, allyloxyacetic acid, allyloxypropionic acid, vinyl acetic acid, allylacetic acid and vinyloxyacetic acid.

Further, the film-forming copolymers thus produced from monomeric monobasic unsaturated acids can be neutralized by reacting the copolymer with an inorganic or organic base using conventional techniques. The degree of neutralization can range between about 50 to 150% of the level corresponding to stoichiometric neutralization.

Among the mineral and organic bases that can be utilized are, for instance, ammonia, 2-amino-2-methyl-1,3-propanediol (AMPD), 2-amino-2-ethyl-1,3-propanediol (AEPD), triethanolamine (TEA) and the like. The neutralization reaction can take place at atmospheric pressure in the presence of a solvent for the copolymer, if desired, such as an alcohol, for instance ethyl alcohol or the like.

Generally, the molecular weight of the copolymers used in the film-forminy compositions of the invention ranges between about 10,000 and 100,000.

The cosmetic vehicle or carrier employed in combination with the film-forming copolymer to produce the hair set lacquer and lotion of this invention can be any conventional cosmetically acceptable vehicle or carrier such as alcohol, preferably a lower alkanol, water and their mixtures. Additionally, the hair set lacquer and lotion can be produced in the form of a solution, a gel, a cream or a foam and ideally it can be provided in the form of a sprayable aerosol composition.

For instance, in accordance with the present invention, an aerosol lacquer for the hair can be made by introducing 1 to 4 weight percent of a copolymer such as those described above into a mixture comprising ¼ to ⅓ by weight alcohol, such as ethyl alcohol or any other convenient lower alkanol, and ⅔ to ¾ by weight pressurized liquid propellant gas such as trichlorofluoromethane or any other conventional fluoralkane propellant material.

A hair set lotion according to the invention can be made, for example, by introducing 1 to 3 weight percent, with reference to the solution, of a copolymer as described, in an aqueous alcohol solution having a titer less than 70° alcohol. Preferably the alcohol is a lower alkanol.

The cosmetic compositions of the invention can also include cosmetic adjuvants of the usual kind such as plasticizers, perfumes, dyes, cationic products to facilitate untangling, nonionic products to ensure peptizing of the perfumes, silicones to enhance brilliance, or other cosmetic resins.

The present invention is also directed to novel copolymers of 40–90 weight percent N-vinyl pyrrolidone, 5 to 40 weight percent of a comonomer selected from the group consisting of vinyl stearate and vinyl laurate and 5–20 weight percent of a further comonomer selected from the group consisting of crotonic acid, vinyl acetic acid, allylacetic acid and allyloxyacetic acid. The novel copolymers can be produced by employing conventional polymerization techniques as described hereinbefore.

In the following examples, which further illustrate the present invention, all parts and percentages are by weight unless otherwise indicated.

EXAMPLE 1

Preparation of a N-vinyl pyrrolidone (75%)/vinyl stearate (15%)/allyloxyacetic acid (10%) copolymer On a 250 ml. vessel fitted with an agitator, a reflux cooler, a thermometer and nitrogen lead-in tube, there are placed 75 g. N-vinyl pyrrolidone, 15 g. vinyl stearate, 10 g. allyloxyacetic acid, 200 g. ethanol and 0.7 g. azo-bis-iso-butyronitrile. The mixture is heated to 78 to 82° C. with reflux for 16 hours.

After cooling, there is obtained in quantitative yield a very pale amber viscous product. Precipitation of the copolymer is effected with petroleum ether and after drying the desired copolymer is obtained in a 75% yield, having the following characteristics:

Acid number: 39.1 (calculated value: 48)
Viscosity=2.0 cp.
(5% copolymer solution in DMF at 35° C.)

EXAMPLE 2

Preparation of N-vinyl pyrrolidone (70%)/vinyl laurate (20%)/allyloxyacetic acid (10%) copolymer In a 250 ml. vessel fitted with an agitator, a reflux cooler, a thermometer and a nitrogen lead-in tube, there are placed 70 g. N-vinyl pyrrolidone, 20 g. vinyl laurate, 10 g. allyloxyacetic acid, 200 g. ethanol and 1 g. azo-bis-iso-butyronitrile. The mixture is heated to 80° C. and held at this temperature for 10 hours.

After cooling, there is obtained in quantitative yield, a viscous product. The desired copolymer is then precipitated by the addition of petroleum ether to the cooled reaction mixture and after drying the precipitate the desired copolymer is obtained in a 70% yield. The resulting copolymer has the following characteristics:

Acid number: 46.5 (calculated value: 48)
Viscosity =1.68 cp.
(5% solution of the copolymer in DMF at 35° C.)

EXAMPLE 3

Preparation of N-vinyl pyrrolidone (40%)/vinyl stearate (40%)/crotonic acid (20%) copolymer In a 250 ml. vessel fitted with an agitator, a reflux cooler, a thermometer and a nitrogen lead-in tube, there are placed 40 g. N-vinyl pyrrolidone, 40 g. vinyl stearate, 20 g. crotonic acid, 100 g. absolute ethanol and 2 g. azo-bis-iso-butyronitrile.

The mixture is heated at a temperature of 80° C. with reflux for 24 hours. The reaction mixture is then allowed to cool and the copolymer that is formed is precipitated by the addition of petroleum ether to the cooled reaction mixture.

The resulting precipitate is dried, and the desired copolymer is obtained in the form of a white powder with a 43% yield, the said copolymer having the following characteristics:

Acid number: 133 (calculated value=130)
Viscosity=1.23 cp.
(5% solution of copolymer is DMF at 35° C.)

EXAMPLE 4

Preparation of N-vinyl pyrrolidone (75%)/vinyl laurate (20%)/vinylacetic acid (5%) copolymer In a 250 ml. vessel fitted with an agitator, a reflux cooler, a thermometer and a nitrogen lead-in tube these are placed 75 g. N-vinyl pyrrolidone, 20 g. vinyl laurate, 5 g. vinylacetic acid, 100 g. ethanol and 2 g. azo-bis-iso-butyronitrile.

The mixture is heated at a temperature of 80° C. with reflux for 24 hours and then allowed to cool. The resulting copolymer is precipitated by the addition of petroleum ether to the cooled reaction mixture.

The resulting precipitate is dried, and the desired copolymer is obtained as a yellowish powder in a 45% yield, the said copolymer having the following characteristics:

Acid number: 17.32 (calculated value: 32.5)
Viscosity=1.78 cp.
(5% solution of copolymer in DMF at 35° C.)

EXAMPLE 5

Preparation of N-vinyl pyrrolidone (90%)/vinyl stearate (5%)/allylacetic acid (5%) copolymer In a 250 ml. vessel fitted with an agitator, a reflux cooler, a thermometer and nitrogen lead-in tube, there are placed 90 g. N-vinyl pyrrolidone, 5 g. vinyl stearate, 5 g. allylacetic acid, 100 g. ethanol and 2 g. azo-bis-iso-butyronitrile.

The mixture is heated at a temperature of 80° C. with reflux for 24 hours and then allowed to cool. The resulting copolymer is then precipitated by adding petroleum ether to the cooled reaction mixture.

The precipitate is dried and the desired copolymer is obtained as a white powder in a 30% yield, the said copolymer having the following characteristics:

Acid number: 12.13 (calculated value: 28)
Viscosity=2.19 cp.
(5% solution of copolymer in DMF at 35° C.)

Other copolymers similar to those prepared in Examples 1–5 are produced using instead, essentially equivalent amounts of other vinyl esters of monobasic acids having 2–22 carbon atoms such as vinyl acetate, vinyl propionate, vinyl butyrate, vinyl caproate, vinyl octanoate, vinyl palmitate and vinyl behenate, so that the resulting copolymers contain as little as about 5–40 weight percent of said vinyl ester. The amount of N-vinyl pyrrolidone present in these copolymers ranged from about 40–90 weight percent. Additionally, these copolymers are also produced using additionally acids other than those specified in Examples 1–5 such as allyloxypropionic acid and vinyloxyacetic acid, the acid being present in the copolymers in amounts ranging from about 3–20 weight percent.

Neutralization of such copolymers is also effected by reaction thereof with such alkaline agents as 2-amino-2-methyl-1,3-propanediol, triethanolamine and 2-amino-2-ethyl-1,3-propanediol.

The following examples illustrate the production, according to the present invetion, of hair lacquers and lotions.

EXAMPLE 6

The following solution is prepared:

Copolymer described in Example 1: 3 g.
2-amino-2-methyl-1,3-propanediol in sufficient quantity for 100% neutralization.
Ethyl alcohol in sufficient quantity to make: 50°.
Water in sufficient quantity to make up: 100 ml.

This solution is applied to he hair for a wave set and a plastic, very brilliant film is obtained which imparts excellent qualities to the hair set.

EXAMPLE 7

The following solution is prepared:

Copolymer described in Example 2: 3 g.
2-amino-2-methyl-1,3-propanediol in sufficient quantity for 100% neutralization.
Ethyl alcohol in sufficient quantity to make: 50°.
Water in sufficient quantity to make up: 100 ml.

This solution, used as hair set lotion, produces a very brilliant plastic film.

EXAMPLE 8

To make an aerosol lacquer for the hair, a solution of the following composition is made:

Copolymer described in Example 1: 7.2 g.
Triethanolamine in sufficient quantity for 100% neutralization.
Perfume: 0.3 g.
Absolute ethanol in sufficient quantity to make up: 100 g.

25 g. of this solution is stored in an aerosol can with 47 g. of trichloromonofluoromethane and 28 g. of dichlorodifluoromethane.

By spraying, a lacquer is obtained that imparts suppleness and great brilliance to the hair.

EXAMPLE 9

To make an aerosol lacquer for the hair, a solution having the following composition is prepared:

Copolymer described in Example 2: 7.2 g.
Triethanolamine in sufficient quantity for 100% neutralization.
Perfume: 0.3 g.
Absolute ethanol in sufficient quantity to make up: 100 g.

25 g. of this solution is stored in an aerosol can with 47 g. of trichloromonofluoromethane and 28 g. of dichlorodifluoromethane.

After spraying, a lacquer is obtained that imparts suppleness and great brilliance to the hair and is easily removed, when desired, by brushing the hair.

EXAMPLE 10

The following solution is prepared:

Copolymer described in Example 3: 3 g.
2-amino-2-methyl-1,3-propanediol in sufficient quantity for 100% neutralization.
Ethyl alcohol in sufficient quantity to make: 50°.
Water in sufficient quantity to make up: 100 ml.

When applied as a wave set lotion this solution gives a very brilliant plastic film for the hair.

EXAMPLE 11

To make an aerosol lacquer for the hair a solution having the following composition is prepared:

Copolymer described in Example 4: 7.2 g.
Triethanolamine in sufficient quanity for 100% neutralization.
Perfume: 0.3 g.
Isopropyl alcohol in sufficietn quantity to make up: 100 g.

25 g. of this solution is stored in an aerosol can with 47 g. of trichloromonofluoromethane and 28 g. of dichlorodifluoromethane.

After spraying there is obtained a lacquer that imparts great brilliance to the hair and is easily brushed out.

EXAMPLE 12

To make an aerosol lacquer for the hair, a solution having the following composition is prepared:

Copolymer described in Example 5: 7.2 g.
2-amino-2-ethyl-1,3-propanediol in sufficient quantity for 100% neutralization.
Perfume: 0.3 g.
Isopropyl alcohol in sufficient quantity to make up: 100 g.

25 g. of this solution is stored in an aerosol can with 47 g. of trichloromonofluormethane and 28 g. of dichlorodifluoromethane.

After spraying there is obtained a lacquer that imparts great brilliance to the hair and is easily removed by brushing or shampooing the hair.

EXAMPLE 13

The following solution is prepared:

Copolymer described in Example 4: 3 g.
2-amino-2-methyl-1,3-propanediol in sufficient quantity for 100% neutralization.
Ethyl alcohol in sufficient quantity to make: 50°.
Water in sufficient quantity to make up: 100 ml.

Applied as hair set lotion, this solution gives a plastic film of great brilliance.

EXAMPLE 14

The following solution is prepared:

Copolymer described in Example 5: 3 g.
2-amino-2-methyl-1,3-propanediol in sufficient quantity for 100% neutralization.
Ethyl alcohol in sufficient quantity to make: 50°.
Water in sufficient quantity to make up: 100 ml.

When applied as a hair set lotion, this solution gives a plastic film of great brilliance.

Sprayable aerosol lacquers are also prepared in a manner essentially the same as set forth in Examples 8, 9, 11 and 12, using instead, copolymers containing essentially equivalent amounts of (1) N-vinyl pyrrolidone, (2) vinyl esters other than those of Examples 1–5 herein, that is such vinyl esters as vinyl acetate, vinyl propionate, vinyl butyrate, vinyl caproate, vinyl octanoate, vinyl palmitate and vinyl behenate and (3) acids also other than those of Examples 1–5 herein, for instance, allyloxypropionic acid and vinyloxyacetic acid.

Moreover solutions useful as hair set lotions are also prepared in a manner essentially as that set forth in Examples 6, 7, 10, 13 and 14 using the same additional vinyl esters and acids disclosed immediately above, which esters and acids are in addition to those specifically recited in Examples 1–5 herein.

What is claimed is:

1. A hair lacquer or lotion composition comprising in a solvent selected from the group consisting of water, an alcohol selected from the group consisting of ethanol and isopropanol and an aqueous solution of said alcohol, 1 to 3 percent by weight of a copolymer of 40 to 90 weight percent N-vinyl pyrrlidone, 5 to 40 weight percent vinyl ester of a saturated monocarboxylic acid containing 2–22 carbon atoms and 3 to 20 weight percent unsaturated monobasic carboxylic acid selected from the group consisting of crotonic acid, allyloxyacetic acid, allyloxypropionic acid, vinyl acetic acid, allylacetic acid and vinyloxyacetic acid, said copolymer having a molecular weight ranging between about 10,000 and 100,000.

2. The composition of claim 1 wherein said vinyl ester is selected from the group consisting of vinyl acetate, vinyl propionate, vinyl butyrate, vinyl caproate, vinyl octanoate, vinyl laurate, vinyl palmitate, vinyl stearate, vinyl isostearate and vinyl behenate.

3. The composition of claim 1 wherein said solvent is an aqueous alcohol solution having a titer below 70° alcohol.

4. The composition of claim 1 wherein said copolymer is neutralized by an alkaline agent selected from the group consisting of ammonia, 2-amino-2-methyl-1,3-propanediol, 2-amino-2-ethyl-1,3-propanediol and triethanolamine, said alkaline agent being present in sufficient amounts so that a level of neutralization ranges between 50 and 150 percent of the level that corresponds to stoichiometry.

5. A sprayable hair lacquer composition comprising a mixture of ¼ to ⅓ by weight of an alcohol selected from the group consisting of ethyl alcohol and isopropyl alcohol, and ⅔ to ¾ by weight of a liquefied propellant gas under pressure and 1 to 4 percent by weight of said mixture of a copolymer of 40 to 90 weight percent N-vinyl pyrrolidone, 5 to 40 weight percent vinyl ester of a saturated monocarboxylic acid containing 2–22 carbon atoms and 3 to 20 weight percent unsaturated monobasic carboxylic acid selected from the group consisting of crotonic acid, allyoxyacetic acid, allyloxypropionic acid, vinyl acetic acid, allylacetic acid and vinyloxyacetic acid, said copolymer having a molecular weight ranging between about 10,000 and 100,000.

6. The sprayable aerosol of claim 5 wherein said propellant gas is a fluorochlorinated hydrocarbon.

7. The sprayable aerosol of claim 5 wherein said vinyl ester is selected from the group consisting of vinyl acetate, vinyl propionate, vinyl butyrate, vinyl caproate, vinyl octanoate, vinyl laurate, vinyl palmitate, vinyl stearate, vinyl isostearate and vinyl behenate.

8. The sprayable aerosol of claim 5 wherein said copolymer is neutralized by an alkaline agent selected from the group consisting of ammonia, 2-amino-2-methyl-1,3-propanediol, 2-amino-2-ethyl-1,3-propanediol and triethanolamine, said alkaline agent being present in sufficient amounts so that a level of neutralization ranges between 50 and 150 percent of the level that corresponds to stoichiometry.

References Cited
UNITED STATES PATENTS

| | | | |
|---|---|---|---|
| 3,222,329 | 12/1965 | Grosser et al. | 260—80.72 |
| 3,321,408 | 5/1967 | Briggs | 252—161 |
| 3,405,084 | 10/1968 | Bohac et al. | 260—80.72 X |
| 3,484,420 | 12/1969 | Chihara | 260—85.7 X |
| 3,579,629 | 5/1971 | Pasero et al. | 424—47 |

ALBERT T. MEYERS, Primary Examiner

V. C. CLARKE, Assistant Examiner

U.S. Cl. X.R.

8—127.51; 260—27.6 T, 27.68 A, 33.4 R, 337 UA, 78.3 UA, 80.72; 424—DIG 1 & 2, 71, 78